(12) United States Patent
Suresh

(10) Patent No.: US 11,384,871 B2
(45) Date of Patent: Jul. 12, 2022

(54) AXIAL SWAGE TOOL

(71) Applicant: Aerofit, LLC, Fullerton, CA (US)

(72) Inventor: Srinivas B. Suresh, Artesia, CA (US)

(73) Assignee: AEROFIT, LLC, Fullerton, CA (US)

( * ) Notice: Subject to any disclaimer, the term of this patent is extended or adjusted under 35 U.S.C. 154(b) by 0 days.

(21) Appl. No.: 16/555,593

(22) Filed: Aug. 29, 2019

(65) Prior Publication Data

US 2020/0088326 A1  Mar. 19, 2020

Related U.S. Application Data

(63) Continuation of application No. 15/017,508, filed on Feb. 5, 2016, now Pat. No. 10,400,921.

(60) Provisional application No. 62/157,370, filed on May 5, 2015.

(51) Int. Cl.
*F16L 13/14* (2006.01)
*B25B 27/10* (2006.01)
*B21D 39/04* (2006.01)

(52) U.S. Cl.
CPC ............ *F16L 13/146* (2013.01); *B25B 27/10* (2013.01); *B21D 39/046* (2013.01); *F16L 2013/145* (2013.01)

(58) Field of Classification Search
CPC .. F16L 13/146; F16L 2013/145; B25B 27/10; B21D 39/046
See application file for complete search history.

(56) References Cited

U.S. PATENT DOCUMENTS

| 4,189,817 | A | * | 2/1980 | Moebius | B25B 27/10 |
| | | | | | 29/237 |
| 5,277,089 | A | | 1/1994 | McGushion | |
| 5,297,325 | A | * | 3/1994 | Thelen | B25B 27/10 |
| | | | | | 29/237 |
| 5,305,510 | A | | 4/1994 | Croft et al. | |
| 5,398,394 | A | * | 3/1995 | Hyatt | B21D 39/04 |
| | | | | | 29/237 |
| 5,592,726 | A | * | 1/1997 | Suresh | B21D 39/04 |
| | | | | | 29/237 |
| 5,680,687 | A | * | 10/1997 | Hyatt | B21D 39/04 |
| | | | | | 29/237 |

(Continued)

FOREIGN PATENT DOCUMENTS

| JP | 05-37465 U | 5/1993 |
| JP | 10-511897 A | 11/1998 |

(Continued)

OTHER PUBLICATIONS

International Search Report and Written Opinion of the International Searching Authority for International Application No. PCT/US2016/030370, dated Jun. 10, 2016.

(Continued)

*Primary Examiner* — Bayan Salone
(74) *Attorney, Agent, or Firm* — Knobbe, Martens, Olson & Bear, LLP

(57) ABSTRACT

Embodiments of the present disclosure provide an axial swage tool configured to axially swage a fitting to a tube, a cable, or other such item of manufacture. The swage tool can be configured to utilize swaging engagement members for grasping and driving a swaging ring over a fitting. The swaging ring thereby radially compresses the fitting around the tube or other item.

16 Claims, 9 Drawing Sheets

(56) References Cited

U.S. PATENT DOCUMENTS

| | | | | |
|---|---|---|---|---|
| 5,694,670 | A * | 12/1997 | Hosseinian | B21D 39/04 29/237 |
| 6,430,792 | B1 * | 8/2002 | Foster | B21D 39/046 29/237 |
| 6,434,808 | B1 * | 8/2002 | McKay | B25B 27/10 29/237 |
| 6,668,613 | B2 * | 12/2003 | Lefavour | B25B 27/10 29/751 |
| 6,823,573 | B2 * | 11/2004 | Morrison | B25B 27/10 29/237 |
| 7,155,790 | B2 * | 1/2007 | Palejwala | B25B 27/10 29/237 |
| 7,337,514 | B2 * | 3/2008 | McKay | B25B 27/10 29/237 |
| 8,458,876 | B2 * | 6/2013 | Danhash | B21D 39/04 29/237 |
| 9,266,164 | B2 * | 2/2016 | Wilcox | B21J 15/022 |
| 9,604,273 | B1 * | 3/2017 | Hogan | B23P 19/027 |
| 10,400,921 | B2 * | 9/2019 | Suresh | F16L 13/146 |
| 10,828,757 | B2 * | 11/2020 | Gallegos | B25B 27/10 |
| 2003/0167614 | A1 * | 9/2003 | Morrison | B25B 27/10 29/237 |
| 2003/0188566 | A1 * | 10/2003 | Lefavour | H01R 43/0427 72/453.16 |
| 2005/0081359 | A1 * | 4/2005 | Palejwala | B25B 27/10 29/516 |
| 2009/0300917 | A1 * | 12/2009 | Hwang | B25B 27/10 29/890.15 |
| 2012/0030917 | A1 * | 2/2012 | Danhash | B21D 39/04 29/237 |
| 2014/0033491 | A1 * | 2/2014 | Donaldson | B29C 66/1224 29/237 |

FOREIGN PATENT DOCUMENTS

| | | |
|---|---|---|
| JP | 11-506394 A | 6/1999 |
| JP | 2005-522618 A | 7/2005 |
| WO | WO 96/20807 A1 | 7/1996 |
| WO | WO 96/37318 A1 | 11/1996 |

OTHER PUBLICATIONS

International Search Report and Written Opinion of the International Searching Authority for International Application No. PCT/US2017/060699, dated Feb. 2, 2018.

* cited by examiner

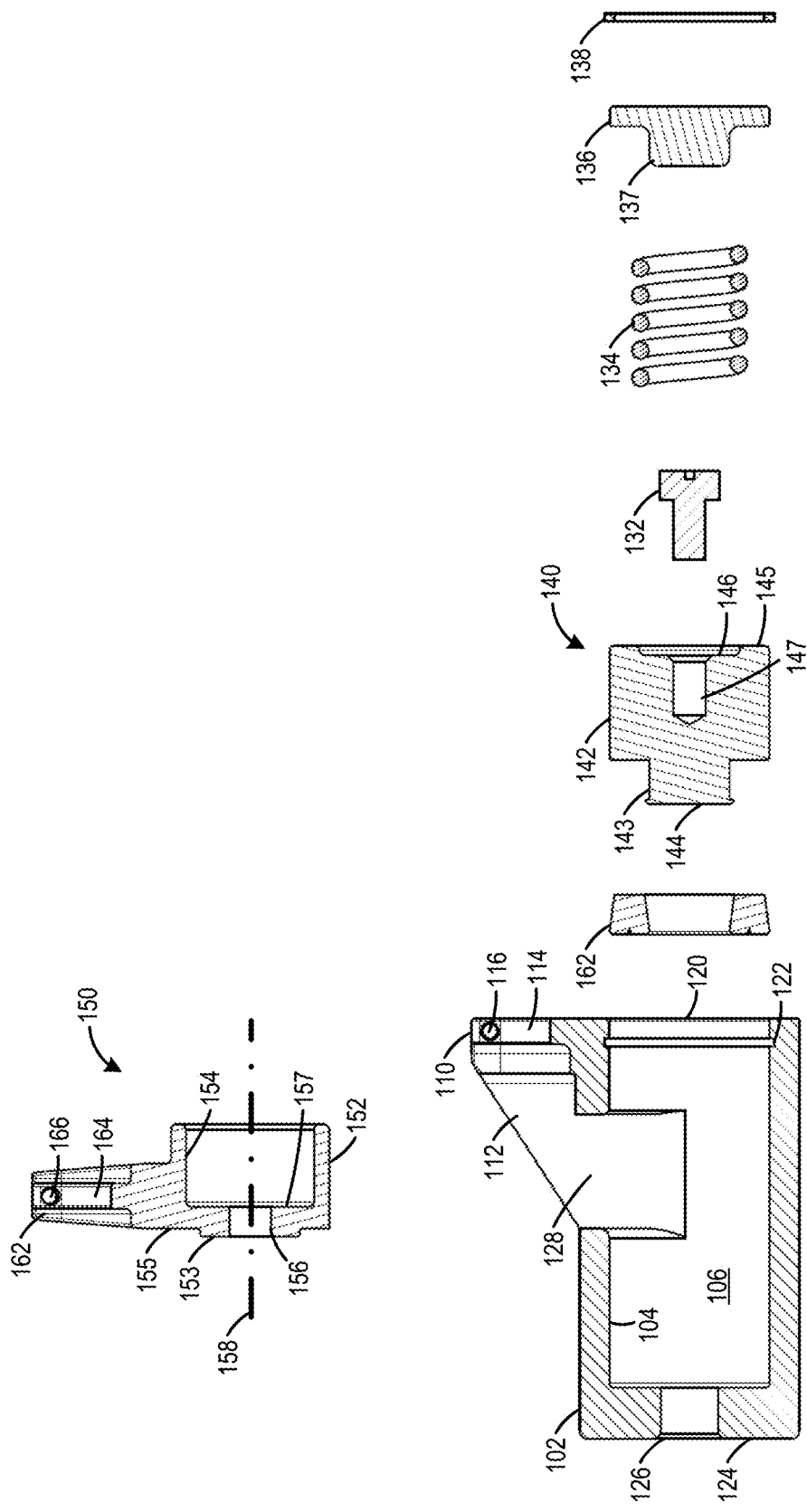

AXIAL SWAGE TOOL

INCORPORATION BY REFERENCE TO ANY PRIORITY APPLICATIONS

Any and all applications for which a domestic priority claim is identified in the Application Data Sheet as filed with the present application are incorporated by reference under 37 CFR 1.57 and made a part of this specification.

BACKGROUND

Field

The present disclosure relates to tools for use in swaging and, more particularly, to a swaging tool for swaging axially swaged fittings.

Description of the Related Art

Swaged fittings have been used for many years to connect tubes and pipes in various types of systems, including fluid systems used in the aircraft, marine, petroleum and chemical industries, as well as power transmission systems and the like. In a typical fluid system, the ends of two tubes are inserted into opposing ends of a fitting, each of which is usually in the form of a cylindrical sleeve or other type of fitting body. The fitting is then swaged with a swaging tool to produce a fluid-tight connection placing the tubes in fluid communication. This swaging operation is normally carried out by applying a radial force that radially compresses the fitting and tubing inwardly. This radial force may be applied directly by the swaging tool or indirectly by a specially shaped ring that is moved axially by the swaging tool to apply a radial force to the fitting. These fittings are referred to as axially swaged fittings.

Generally axially swaged fittings comprise a cylindrical body having openings at opposite ends for receiving the ends of two tubes, with a swaging ring at each end of the body. The outer surface of the body and the inner surface of the swaging ring contact each other, being shaped such that axial movement of the swaging ring over the body applies a radial force to the body and, thus, to the tubes.

SUMMARY

Swage tools with complex designs can include many moving components, which are subject to wear. In such tools, each component contributes to tolerance buildup, and each area of contact between moving parts is subject to wear. Additional wear results in increased costs, replacement of parts, and decreased performance over the life of the tool.

Accordingly, there exists a need for a compact swaging tool, for swaging axially swaged fittings, that has few moving parts, is lighter in weight, and/or more reliable than prior swaging tools. In various embodiments, the present disclosure provides embodiments of a swage tool that satisfies some or all of these and other needs, and provides further related advantages.

In an illustrative embodiment, the swaging tool includes a housing configured for a first swaging engagement member (e.g., a jaw unit having a yoke). A movable jaw is configured to translate within the housing, the movable jaw being configured for a second swaging engagement member. A piston is configured to drive the movable jaw such that the second engagement member moves toward the first engagement member.

The swaging tool can include substantially fewer parts than many prior art tools, and more particularly, can include fewer moving parts. Advantageously, in some embodiments, the smaller number and simple arrangement of the parts can limit the tolerance build-up, which can otherwise require custom machining during manufacture to achieve acceptable tolerances. Furthermore, the design can limit bearing loads from being distributed in an uneven fashion, which can cause excessive wear.

The axial swage tool can include a spring compressed between a stop plate and the movable jaw. The movable jaw can be compressively held between the spring and the stop plate. The movable jaw can be compressively biased to be stationary, with respect to the housing, by the spring. The spring can become further compressed by the piston when driving the movable jaw axially through the chamber of the housing. The spring can provide for the tool to be self-resetting.

The present disclosure provides embodiments of an axial swage tool including a movable jaw unit that is in direct contact with a piston during a swaging operation. Advantageously, the axial swage tool can have no bearings, no stabilizing pin, and no piston rod. The design of the tool, with the features described below, contributes to a swage tool that can be generally compact, lightweight, and simple. Furthermore, the swage tool of the present disclosure can be generally robust, simple to operate, reliable in use, and relatively low in maintenance.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The term "comprising" is used in the specification and claims, means "consisting at least in part of." When interpreting a statement in this specification and claims that includes "comprising," features other than that or those prefaced by the term may also be present. Related terms such as "comprise" and "comprises" are to be interpreted in the same manner.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

FIG. 4 is an exploded cross-sectional side view of the axial swage tool of FIG. 1.

DETAILED DESCRIPTION

Embodiments of the present disclosure provide an axial swage tool configured to axially swage a fitting to a tube, a cable, or other such item of manufacture. The swage tool can be configured to utilize swaging engagement members for grasping and driving a swaging ring over a fitting. The swaging ring thereby radially compresses the fitting around the tube or other item.

Figure 5A:
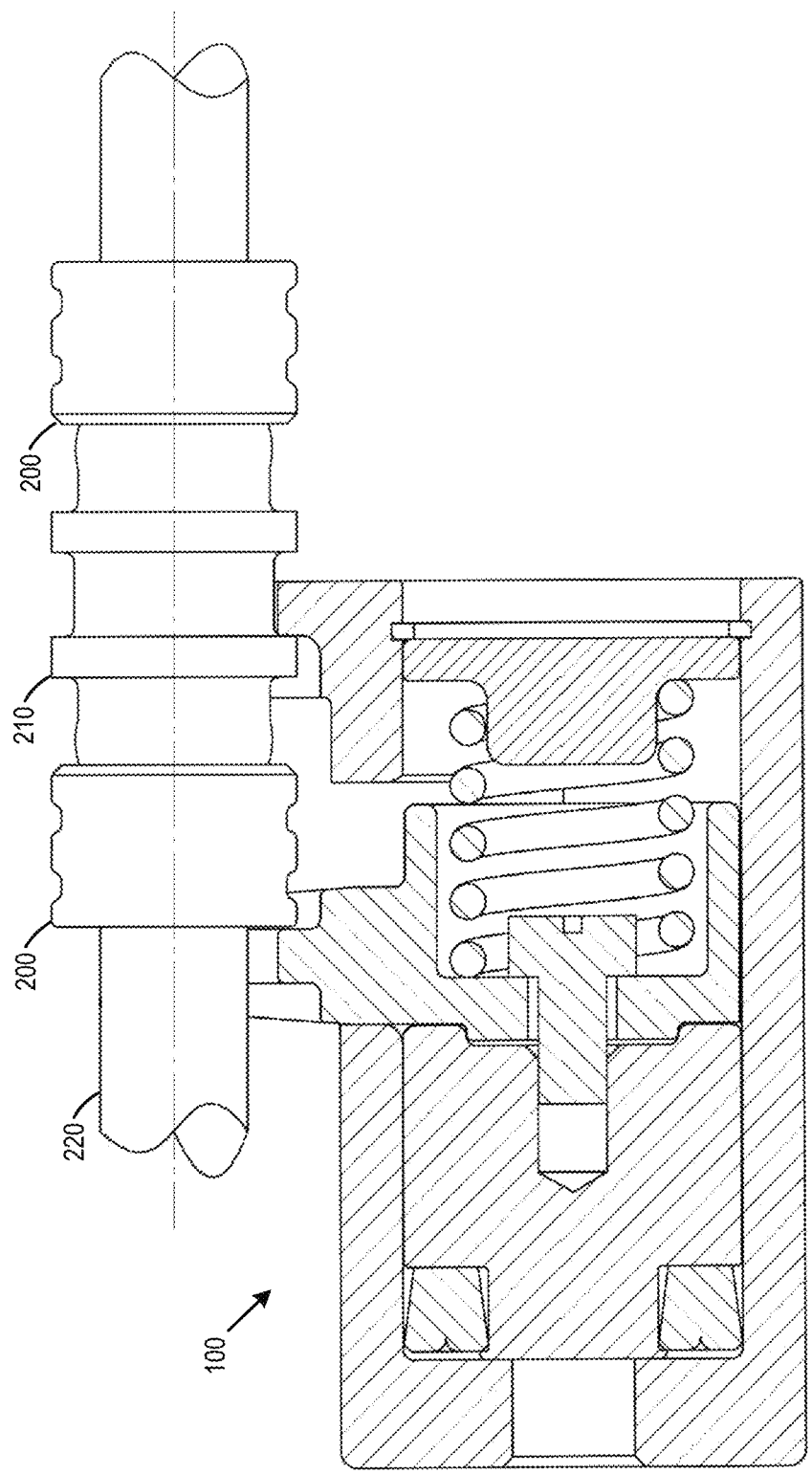
FIG. 5A is a cross-sectional, side view of the axial swage tool of FIG. 1 depicted in a relaxed configuration.
Figure 5B:
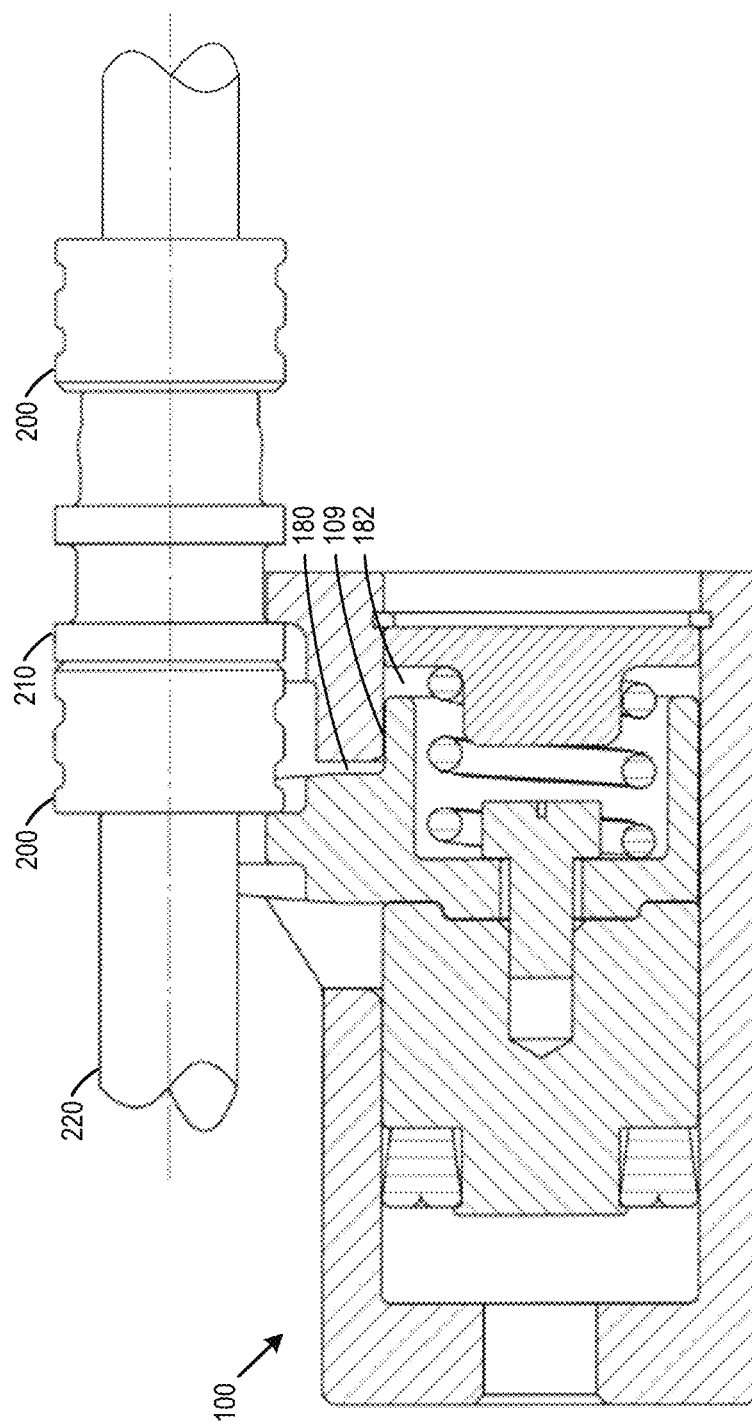
FIG. 5B is a cross-sectional, side view of the axial swage tool of FIG. 1 depicted in an actuated configuration.

With reference to FIGS. 1-4, an embodiment of an axial swage tool 100 is illustrated. The axial swage tool 100 includes a housing 102 having an inner surface 104 that forms a chamber 106. The chamber 106 can have a longitudinal axis 108, also referred to as a chamber axis. The housing 102 includes a fixed jaw unit 110, also referred to as a swaging engagement member. In some embodiments, the jaw unit 110 can be formed into the housing 102. The swage tool 100 also includes a movable jaw 150 having a first portion 151, also referred to as the chamber portion, and a second portion 160, also referred to as the movable jaw unit or swaging engagement member. The fixed jaw unit 110 and the movable jaw unit 160 include yokes that are configured to axially swage a fitting when the chamber portion 151 slides within the chamber 106 such that the movable jaw unit 160 moves toward the fixed jaw unit 110. The yokes of the jaw units are configured to hold a swage fitting 200 and a fitting sleeve, also referred to as a fitting body 210 in order to axially swage a fitting (as illustrated in FIGS. 5A and 5B). The tool 100 can further comprise a seal 130, a piston 140, a fastener 132, a spring 134, a stop plate 136, and a retaining ring 138.

Housing

The housing 102 has an outer surface 118, and an inner surface 104 that forms the chamber 106. The inner surface 104 and chamber 106 can be substantially cylindrical. In some embodiments, the chamber 106 can be a different cross-sectional shape, such as oblong. A first end 120 of the housing 102 defines a chamber opening that preferably is (or is approximately) the same size and shape of the chamber 106. For example, first end 120 can have the same diameter as the inner surface 104. Towards the first end, an annular slot or groove 122 can be formed in the inner surface 104. The annular groove can have a greater diameter than the inner surface and can be sized and shaped to receive a retaining ring 138. A second end 124 of the housing is closed except for a port 126 configured for attaching a fluid source, such as a hydraulic fluid source. In some embodiments, a tube having a threaded housing connection can be coupled to the port 126 and a fluid source can be coupled to a fluid source connection on the other end, such as a quick-release connection.

The first end 120 of the housing 102 can include the fixed jaw unit 110, which can include structural reinforcement flanges 112, a yoke 114, and ball detents 116. The housing jaw unit 110 can be substantially U-shaped, with yoke surfaces facing in a longitudinal direction, such as parallel to the chamber axis, and configured to provide a support for a body 210 or swaging ring 200 during the swaging process. For example, the body 210 can be positioned in the yoke 114 and the swaging ring 200 can be moved axially towards the body 210. The ball detents 116 can be positioned at opposite sides of the yoke 114. The ball detents 116 can provide an indication of a proper fit of the body 210 in the yoke 114. For example, the ball detents 116 can be positioned to ensure that body 210 is properly positioned within the yoke 114. The proper positioning of the body 210 can prevent misuse and prevent damage to the tool during operation, such as damage to the flanges, yoke, body, swaging ring, or other part of the tool.

Figure 3:
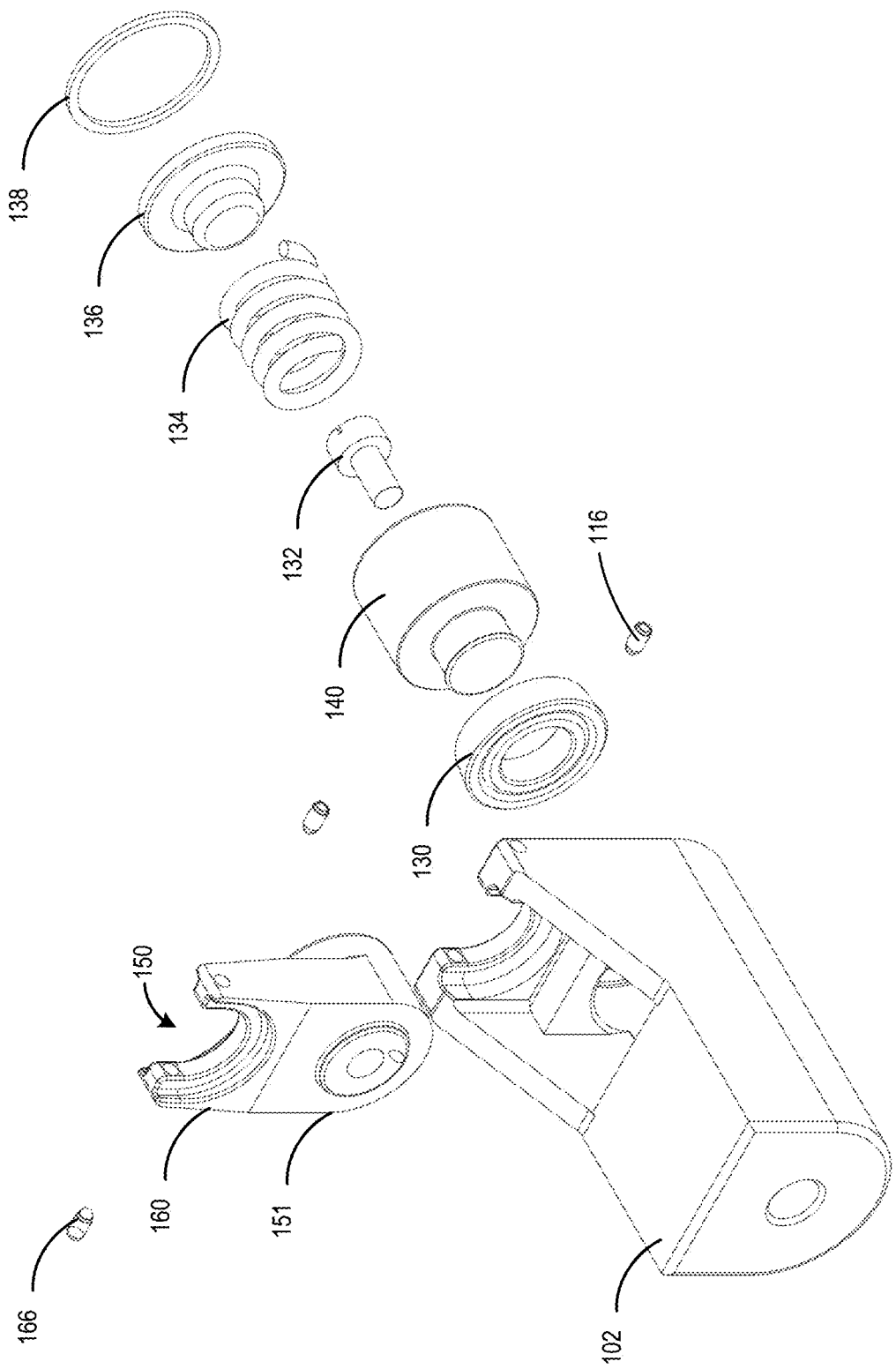
FIG. 3 is an exploded perspective view, depicting the swage tool of FIG. 1.

The housing 102 can have an approximately rectangular cutout 128 (as seen in FIG. 3) in a mid-portion of the housing 102 that permits radial access to the internal chamber 106. Preferably, the width of the cutout 128 is only as wide as is necessary to position the movable jaw 150 within the chamber 106, and the length of the cutout is only as long as is necessary to permit a complete swaging operation. For example, the cutout is long enough to permit the movable jaw 150 to travel from its relaxed-tool position to a fully actuated position, which completes a full swaging operation. In some embodiments, the width of the cutout 128 can be configured to match the width of the movable jaw 150 so that the movable jaw 150 moves axially without rotating. For example, in one embodiment, the differences in widths between the movable jaw 150 and the cutout 128 can be less than or equal to 0.005 inches, less than or equal to 0.002 inches, less than or equal to 0.001 inches, between 0.001 and 0.005 inches, between 0.002 inches and 0.005 inches, or another variation of the measurements.

Movable Jaw

The movable jaw 150 has a first portion 151, also referred to as a chamber portion, and a second portion 160, also referred to as a movable jaw unit or swaging engagement member. The chamber portion 151 is configured to be positioned within the chamber 106 of the housing 102. The chamber portion 151 has an outer surface 152. The curvature of the outer surface 152 is configured to match the curvature of the inner surface 104 of the chamber 106. In some embodiments, at least a portion of the outer surface 152 may be cylindrical. In some embodiments, the outer surface may be a different shape (e.g., cylindrical with a flat portion, oblong, or another shape). The outer surface 152 is configured to be shaped to be translatable within the chamber 106. The outer surface 152 can be sized within a defined tolerance of the inner surface 104 such that the movable jaw is translatable within the chamber without undesirable angular movement during operation of the tool. The difference in measurements (e.g., diameters) can form a gap 109 (not perceptible in the figures) between the outer surface 152 and the inner surface 104. The gap can be defined by a measurement (e.g., a radial dimension, a diameter, a linear measurement, and the like) between the outer surface 152 and inner surface 104. For example, in one embodiment, the differences in measurements (e.g., diameters) of the outer surface 152 and inner surface 104 can be less than or equal to 0.005 inches, less than or equal to 0.002 inches, less than or equal to 0.001 inches, between 0.001 and 0.005 inches, between 0.002 inches and 0.005 inches, or another variation of the measurements. The chamber portion 151 has a first inner surface 154 and a second inner surface 156 forming a through-hole. The first and second inner surfaces can be concentric. A spring engagement surface 157 can be substantially perpendicular to the first and second inner surfaces. The spring engagement surface 157 can extend between the first and second inner surfaces 154 and 156. The first and second inner surfaces can define a chamber portion axis 158 that is configured to align with the chamber axis 108 as the movable jaw 150 moves axially within the housing 102. A piston engagement surface 153 protrudes from a first face 155 of the chamber portion 151. The piston engagement surface 153 can be parallel to the spring engagement surface 157. The piston engagement surface 153 can be sized and shaped to fit within the recess 146 of the piston 140.

The jaw unit portion 160 of the movable jaw can include structural reinforcement flanges 162, a yoke 164, and ball detents 166. The movable jaw unit 160 can be substantially U-shaped, with yoke surfaces facing in a longitudinal direction, such as parallel to the chamber axis, and configured to provide a support for a fitting body 210 or swaging ring 200 during the swaging process. For example, the fitting body 210 can be positioned in the yoke 164 and the swaging ring 200 can be moved axially towards the fitting body. The ball detents 166 can be positioned at opposite sides of the yoke 164. The ball detents 166 can provide an indication of a proper fit of the swaging body in the yoke 164. For example, the ball detents 166 can be positioned to ensure that swaging body are properly positioned within the yoke 164. The proper positioning of the swaging ring or sleeve can prevent misuse and prevent damage to the tool during operation, such as damage to the flanges, yoke, sleeve, swaging ring, or other part of the tool.

The housing jaw unit 110 defines a housing jaw axis and the movable jaw unit 160 defines a movable jaw axis. These axes align to form a swage axis 170 when the movable jaw axis 158 is aligned with the chamber axis 108. The fixed jaw unit 110 provided on the housing 102 and the movable jaw unit 160 are configured to move a swaging ring 200 over a fitting body 210, along the swage axis 170, to swage the fitting to a tube or other item.

Piston

The piston 140 can be configured to be positioned in the second end 124 of the housing 102. An outer surface 142 of the piston 140 can be the same shape as the chamber 106, such as cylindrical. The outer surface 142 of the piston 140 can be sized and shaped, or otherwise configured such that the piston 140 can move axially within the housing chamber 106 (e.g., configured to slide along the chamber axis 108). The piston 140 has a first, closed end 144 forming a head 143 that faces the second end 124 of the housing 102. The diameter of the head 143 can be smaller than the diameter of the outer surface 142. The piston 140 also has a second end 145 opposite the first end 144. The second end 145 has an axial bore 147 (e.g., a cylindrical bore), with a counter-bored or recessed guide surface 146. The bore 147 can be configured to receive a fastener 132 (such as a screw) for securing the movable jaw 150 to the piston 140. The recessed guide surface 146 can be sized and shaped to receive the piston engagement surface 153. The chamber portion 151 of the movable jaw 150 can be configured to mount directly to the piston 140, with the piston engagement surface 153 being positioned adjacent the recessed guide surface 146. The face 155 of the chamber portion 151 can be positioned adjacent the face of the second end 145 of the piston 140. By directly mounting the movable jaw 150 to the piston, the number of moving parts on the tool 100 can be reduced. Additionally, the distance between the chamber axis 108 and the swage axis 170 can be reduced, thereby lowering the moment force generated on the movable jaw 150 during swaging operations.

The outer surface 142 can be sized within a defined tolerance of the inner surface 104 such that the piston 140 is translatable within the chamber without undesirable angular movement during operation of the tool. The difference in sizes between the outer surface 152 and the inner surface 104 can form a gap 109 (not perceptible in the figures). The gap can be defined by a measurement value (e.g., a radial dimension, a diameter, a linear dimension, and the like) between the outer surface 152 and inner surface 104. For example, in one embodiment, the differences in diameters of the outer surface 152 and inner surface 104 can be less than or equal to 0.005 inches, less than or equal to 0.002 inches, less than or equal to 0.001 inches, between 0.001 and 0.005 inches, between 0.002 inches and 0.005 inches, or another variation of the measurements. The size and shape of the outer surface 142 is configured such that the tool can operate without bearings or a piston rod extending axially through the chamber 106. The size and shape reduces rotation on the piston 140 and the movable jaw 150 which can result in the piston 140 and/or movable jaw 150 jamming within the chamber. The length of the piston can also help to prevent angular rotation and increase stability during operation. In some embodiments, a majority of the length of the piston 140 remains in the chamber 106 and does not extend into the opening 128.

When pressurized fluid is introduced through the port 126, it acts against the head 144 of the piston 140, forcing the piston 140, and thereby directly forcing the movable jaw 150, toward the first end 120 of the housing 102. The piston 140 is thus configured such that it can translate axially through the chamber 106 at the second end of the housing 102, toward the first end 120 of the housing, driving the movable jaw 150 and one end of the spring 134 as it moves. This translation toward the first end 120 of the housing 102 can be limited by the depth of the chamber 106, the movable jaw's axial freedom of movement (such as from the fully compressed spring length, the cutout length, or limitations on the movement of the movable jaw 150).

Seal

A seal 130 can be configured to be positioned on the head 143 of the piston 140. The seal 130 can be made of a durable material. When fluid is supplied to the housing chamber via the port 126 on the second end 124 of the housing 102, the fluid is prevented from flowing between the piston outer surface 142 and the housing inner surface 104 by the seal 130. Thus, the piston 140, aided by the seal 130 and the second end 124 of the housing 102 can form a hydraulic chamber and act as an actuator for the tool 100. In some embodiments, the seal can be a polyurethane seal.

Spring Assembly

The piston 140 and movable jaw 150 can be held in position within the housing 102 by the spring 134, stop plate 136, and retaining ring 138. The retaining ring 138 can be seated in the annular slot 122 formed towards the first end 120 of the housing 102. A stop plate 136 can be positioned adjacent the retaining ring. The stop plate 136 can be substantially the same shape (e.g., diameter) as the inner surface 104 of the chamber 106. A protrusion 137 can extend from the stop plate on a face opposite the retaining ring 138. The protrusion 137 can be sized and shaped such that the spring 134 can be positioned around the protrusion and adjacent a face of stop plate 136 opposite the retaining ring 138. When assembled within the tool 100, the spring 134 extends between the stop plate 136 and the spring engagement surface 157 of the movable jaw 150. The stop plate 136 and the spring engagement surface 157 can be configured to receive opposite ends of the spring 134. The protrusion 137 and chamber portion 151 of the movable jaw 150 (such as the depth of the inner surface 154) can be configured to provide additional support to the spring 134 during operation of the tool 100 such that the spring 134 compresses axially without lateral motion. The piston 140, movable jaw 150, and stop plate 136 can be held stationary against the retaining ring 138 by the spring when the tool is in a relaxed position.

Figure 1:
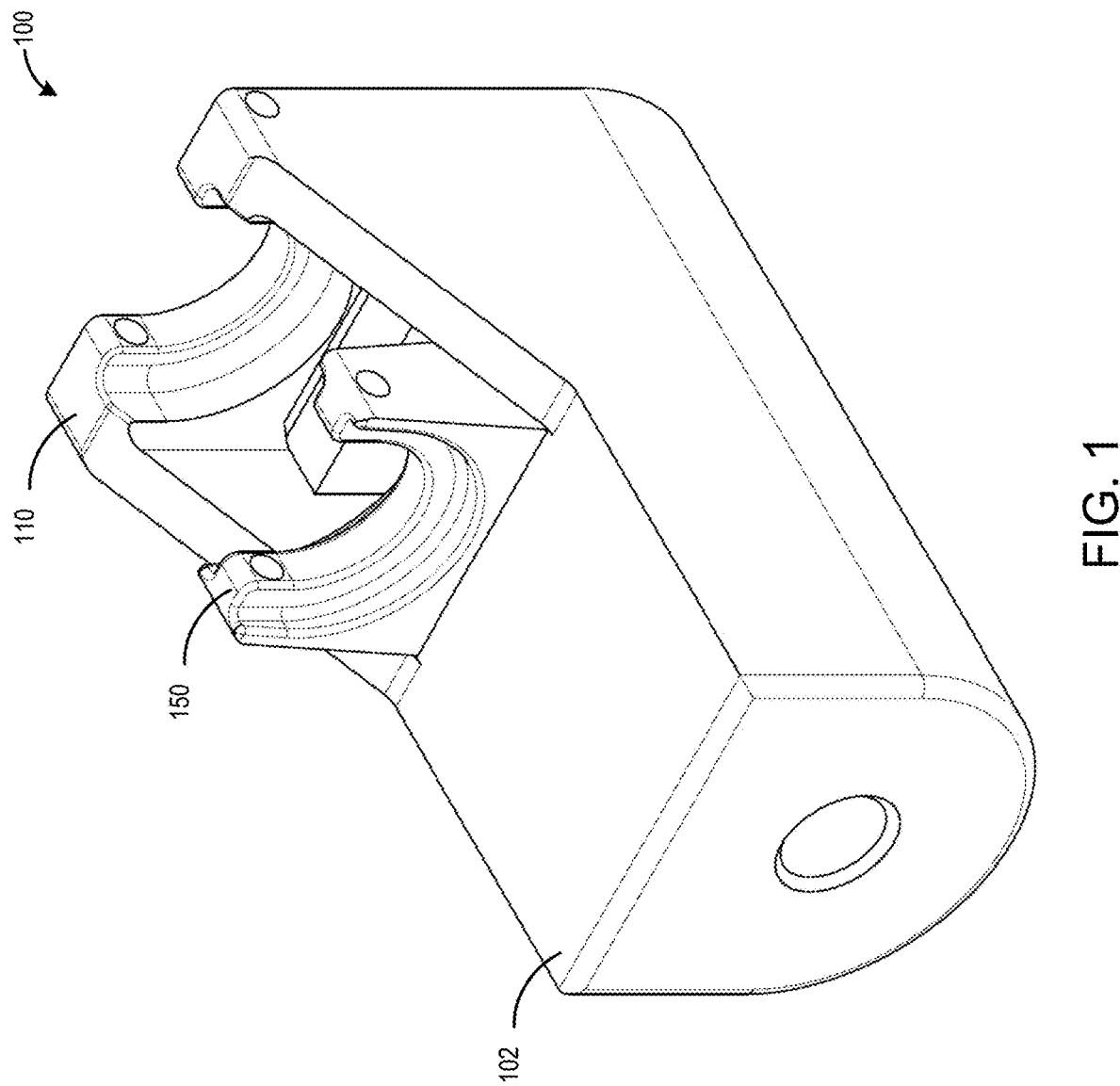
FIG. 1 is a perspective view of an embodiment of an axial swage tool.
Figure 2:
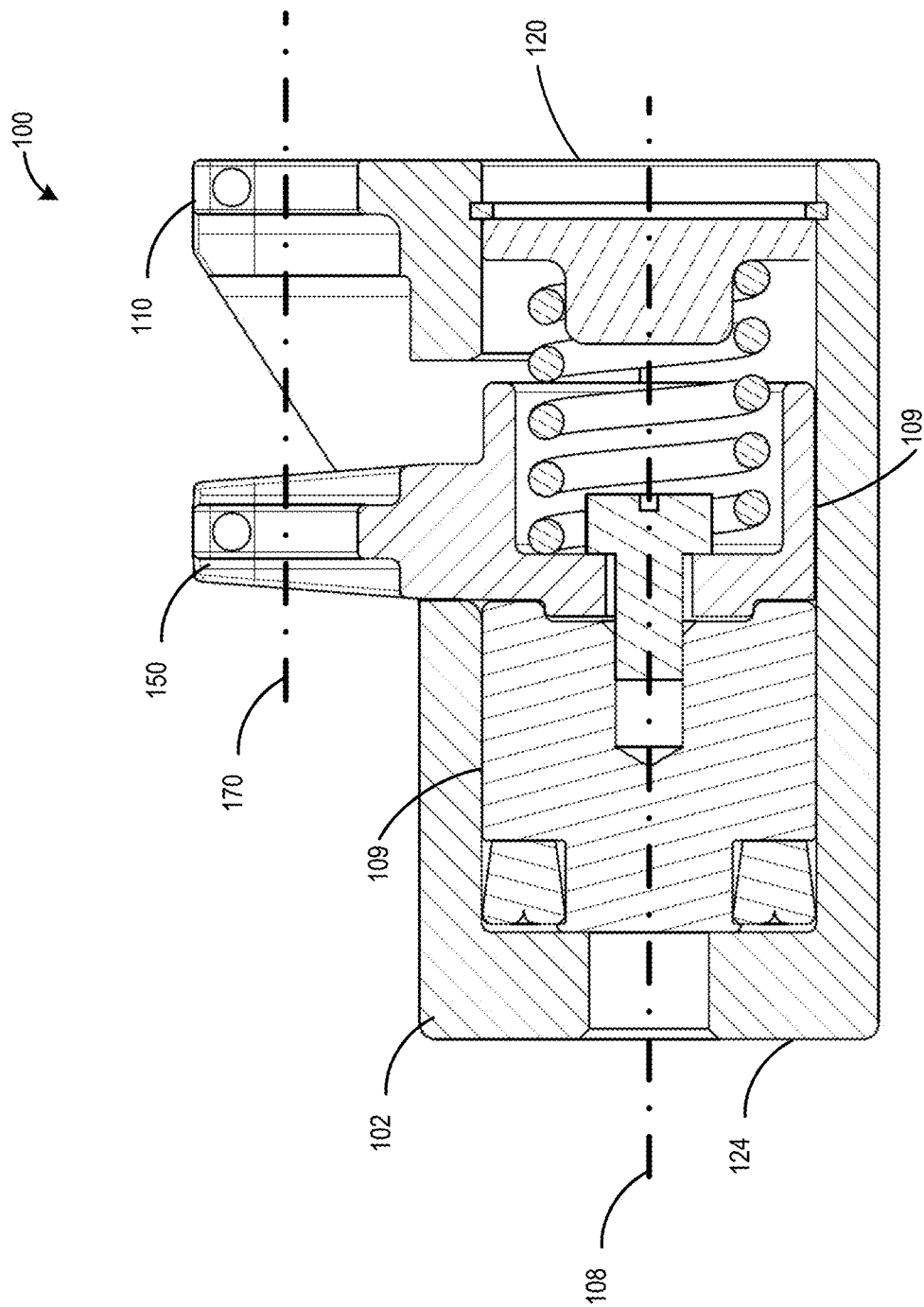
FIG. 2 is a cross-sectional, side view of the embodiment of the axial swage tool of FIG. 1, depicting the swage tool in a relaxed configuration.

With the tool in a relaxed (e.g., not actuated) position (as depicted in FIG. 1), the spring 134 is in a relatively expanded position, pushing the movable jaw 150 toward the second end 124 of the housing 102 against the piston 140. In some embodiments, when the tool 100 is in the relaxed (e.g., not actuated) position, the spring 134 can be continually compressed between the stop plate 136 and the movable jaw 150, with each surface acting as a stop for the spring. The piston 140 in turn pushes against the second end of the housing. The spring's compressive force is pushed against the stop plate 136, which is retained against the retaining ring 138. Rotation of the movable jaw 150 within the chamber 106 can be restricted by the size and shape of the cutout 128.

Axial Swage Tool Assembly

In one embodiment, to assemble the axial swage tool 100, the seal 130, and the piston 140 are inserted into the chamber 106. The seal 130 is mounted on the piston head 153. The piston head 153 and the seal are positioned facing the second end 124 of the housing 102. The seal and/or the piston can be inserted through the housing cutout 128. The chamber portion 151 of the movable jaw 150 is positioned within chamber 106 via the cutout 128. The piston engagement surface 153 of the movable jaw 150 is positioned adjacent the recessed guide surface 146 of the piston 140. The face 155 of the chamber portion 151 can be positioned adjacent the face of the second end 145 of the piston 140. The movable jaw 150 is secured to the piston 140 using a fastener 132. The spring 134 is then inserted through the housing first end and the stop plate 136 is inserted against the spring. The retaining ring 287 is then snapped into the annular slot 122 in the inner surface 104 of the chamber. The compressed spring biases the movable jaw and the piston away from the first end of the housing.

Swaging Operation

With specific reference to FIGS. 5A and 5B, an operator can swage one side of a fitting by engaging a fitting body 210 with a first engagement member. Such as, for example, engaging the fitting body 210 within the yoke 114 of the fixed jaw 110, which is stationary, to restrain the body 210 from movement during swaging. The ball detents 116 can be used to secure the body 210 in the correct position within the first engagement member. The second engagement member, such as the movable jaw yoke 164, is then engaged with an outer surface of the swaging ring 200. The fitting body 210 can be adapted for engaging either of the engagement members (e.g., fixed or movable jaws), so long as the swaging ring 200 is adapted for the other engagement member. Preferably, both engagement members can receive both the fitting body 210 and swaging ring 200.

When pressure is supplied through the port 126, the piston 140, seal 130, and movable jaw 150 are moved toward the first end 120 of the housing 102, compressing the spring 134 and moving the swaging ring 200 over the body 210, thereby swaging the body 210 to the tube 220. More specifically, supplying pressurized fluid into the chamber 106 from a pressurized fluid source (for example, a source of oil at 10,000 psi) applies force axially on the piston 140, pushing it toward the first end 120 of the housing 102. The piston 140 applies the axial force to the movable jaw 150, which in turn applies it to the spring 134. The hydraulic force overcomes the axial spring compression force, and the piston 140, seal 130, and movable jaw 150 translate axially through the housing chamber 106 toward the first end 120 of the housing, compressing the spring 134. Air that is within the chamber 106 of the piston while the tool is in the relaxed state is vented from the tool 100 during actuation via the cutout 128. The movable jaw unit 160 moves toward the fixed jaw unit 110. When a fitting 210 and swaging ring 200 are positioned in yokes of the jaw units during this translation, the swaging ring 200 is driven over the fitting 210, thus forming a swaged fitting on the tube 220 by the time the tool has reached a fully actuated configuration (as depicted in FIG. 5B). The swaging operation is complete when the swaging ring 200 contacts the body 210. The tool is configured such that the movable jaw does not stop prior to the completion of the swaging operation. As can be seen there is a gap 180 between the movable jaw 150 and face of the housing 102. There is a gap 182 between the movable jaw 150 and the stop plate 136. The spring 134 is not fully compressed. In this manner, the swaging operation can complete without encountering a stop that would prematurely stop the swaging operation resulting in an incomplete swage.

At the end of the swaging operation, the pressure source is relieved and the spring force returns the movable jaw 150 and the piston 140 toward the second end 124 of the housing, thereby separating the movable jaw unit 160 from the housing jaw unit 110. When the compressed spring 134 expands, the spring 136 applies force to the movable jaw 150. The movable jaw transmits these forces to the piston 140, which forces the fluid from the chamber 106 and back down the tube. Air is allowed to return to the chamber 106 via the cutout 128 and the tool 100 returns to the relaxed position (FIG. 5A) for the next swaging operation.

Figure 6:
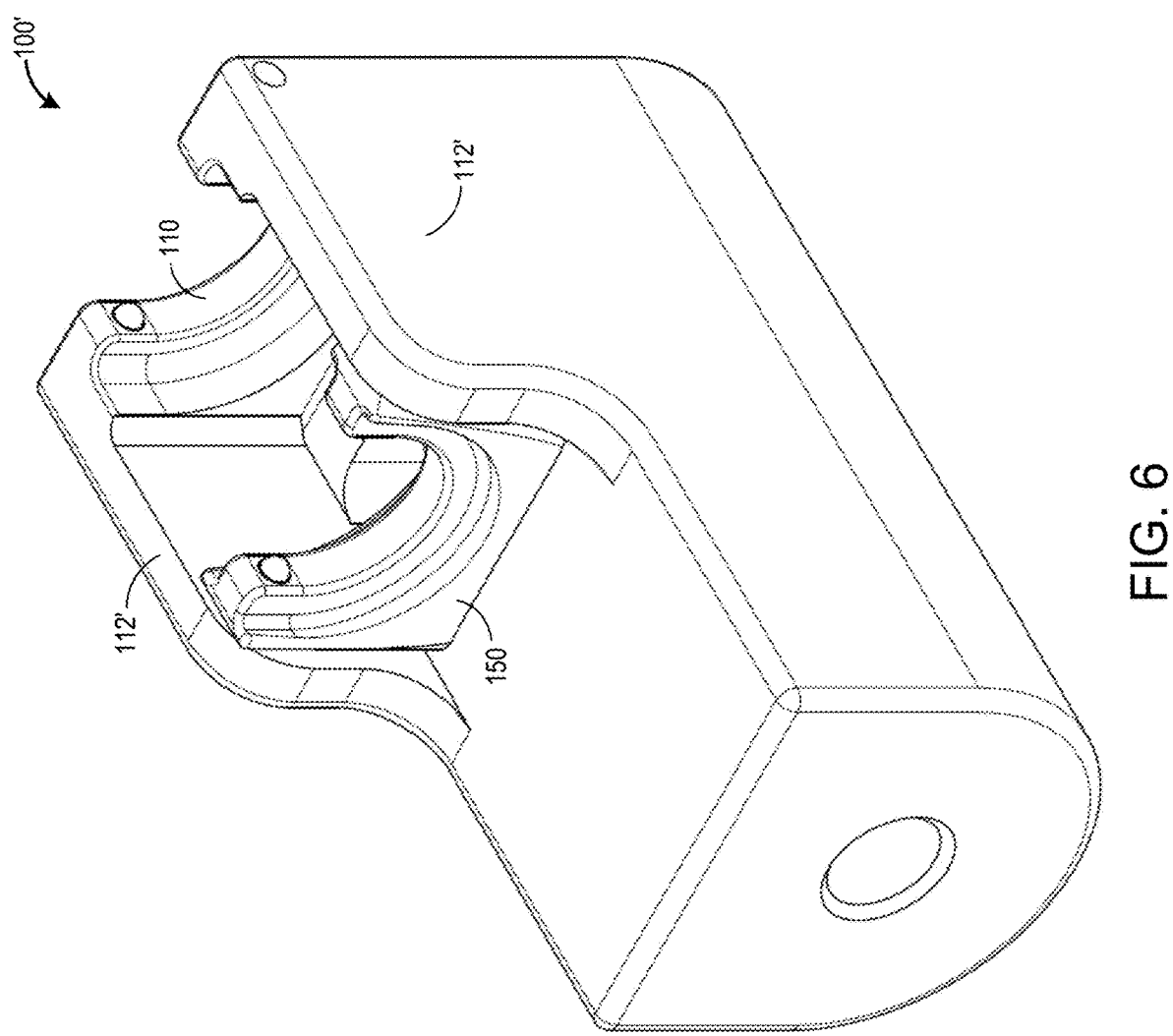
FIG. 6 is a perspective view of another embodiment of an axial swage tool.
Figure 7:
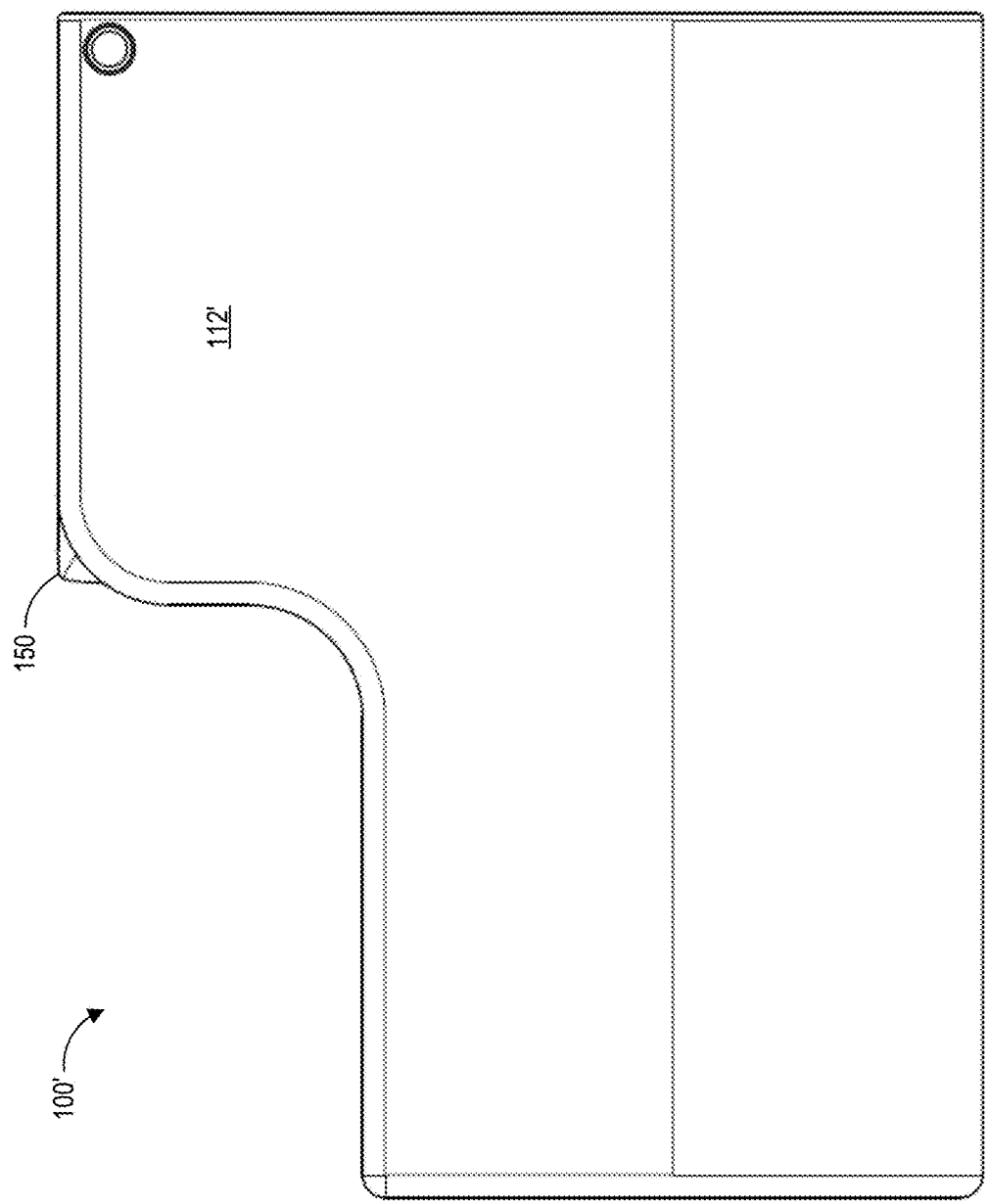
FIG. 7 is a side view of the embodiment of the axial swage tool of FIG. 6.

FIGS. 6 and 7 illustrate an alternate embodiment of the swage tool 100'. The swage tool 100' has modified structural reinforcement flanges 112'. In the illustrated embodiment, the modified flanges 112' extend up to the substantially the height of the movable jaw 150 and the fixed jaw 110. The flanges 112' extend the length of the operational movement of the movable jaw 150. The flanges 112' can provide protection to the operator during operation of the swage tool. The tool 100' operates in accordance with the description of the tool 100 described herein. During operation, the flanges 112' can prevent an operator from inadvertently placing an appendage (e.g., a finger) or piece of equipment between the movable jaw 150 and the fixed yoke 110. Thereby protecting the operator from harm and protecting the swage tool 100' from being damaged.

Figure 8:
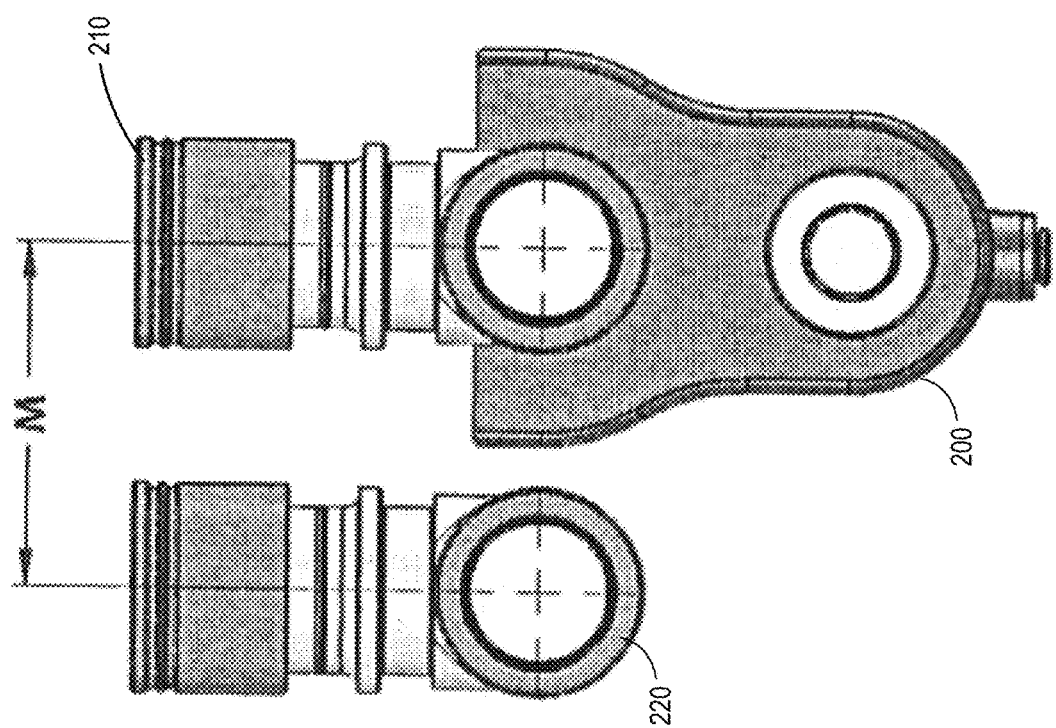
FIG. 8 illustrates an embodiment of port separation between parallel tubing.

FIG. 8 illustrates the port separation for properly swaging parallel tubing 210 and 220. The minimum difference between the parallel tubing is a requirement under the AS6124 standard for "Aluminum Axially swaged fittings Installation and inspection procedure." The standard requires that a minimum port separation distance "M" is required between the fittings in order to engage a swage tool 200 on two parallel fittings without interference for proper swaging.

Recommended minimum port separation distance "M" for various size combinations of aluminum axial swaged fitting series (i.e. a −04 fitting next to a −10 fitting) is given in the AS standard. In some embodiments of the compact swage tool, the "M" value can be smaller than the recommended value in the AS standard. Desirably, when it comes to getting the tubes closer to each other, reducing the "M" value helps fitting more tubes in a given space in an aircraft plumbing design.

The table below shows the range of values for fitting and tool of same size combination. For some exemplary embodiments, the reduced "M" values as compared with the AS values are shown in the table.

| Tube Size | "M"-4 | "M"-6 | "M"-8 | "M"-10 | "M"-12 | "M"-16 |
|---|---|---|---|---|---|---|
| -4 | 0.554 | | | | | |
| AS6124-4 | 0.75 | | | | | |
| -6 | | 0.665 | | | | |
| AS6124-6 | | 0.942 | | | | |
| -8 | | | 0.782 | | | |
| AS6124-8 | | | 1.145 | | | |
| -10 | | | | 0.951 | | |
| AS6124-10 | | | | 1.372 | | |
| -12 | | | | | 1.137 | |
| AS6124-12 | | | | | 1.582 | |
| -16 | | | | | | 1.412 |
| AS6124-16 | | | | | | 1.979 |

In the illustrated embodiments, the piston 140 and movable jaw 150 are held substantially fixed and stationary within the housing 102 by the retaining ring 138 and the spring 134, the spring extending between the stop plate 136 and the movable jaw 150. The piston 140 and the movable jaw 150 are configured to translate axially along the axis 108 when fluid is supplied to the housing chamber via the port 126 on the second end 124 of the housing. No bearing is needed for the piston 140 and movable jaw 150 to freely translate within the housing 102. The seal 130 is configured to form a sealed chamber in the axial end of the housing 102 opposite the retaining ring. The piston 140, the sealed chamber 106, and the source of pressurized fluid are thus configured to actuate the movable jaw axially within the chamber 106.

Embodiments of the present disclosure are characterized by substantially fewer parts than the previously described tool, and more particularly, fewer moving parts. The smaller number of parts likely reduces tolerance build-up, which can otherwise result in the movable jaw-yoke rotating to a less-than-preferred angle with respect to the housing-yoke. Furthermore, because the prior art bearing on the stabilizing pin had to pass into portions of the housing having lobes that provide uneven support (i.e., support around less than the full circumference), that bearing was subject to wear at a rate greater than other parts. The elimination of the stabilizing pin provides the piston-bearing with 360 degree support, and thus tends to provide for a tool with preferable overall durability.

From the foregoing, it will be appreciated that the swaging tool of the present invention preferably provides a swaging tool of greatly reduced size, weight and complexity, which typically results in a more reliable and less expensive swaging tool. The tool has few maintenance requirements. These and other advantages give the swaging tool of the present invention unique advantages.

Although certain features, aspects and advantages of the present disclosure have been described in terms of a certain embodiments, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects, and advantages are necessarily required to practice the present invention. Accordingly, the scope of the present invention is intended to be defined only by the claims that follow.

What is claimed is:

1. A swaging tool for swaging, comprising:
   a housing comprising:
   an outer surface;
   a chamber having a first end, a second end, an inner wall, and an axis extending through the chamber, wherein the housing comprises an opening in the outer surface to the chamber, wherein the chamber has a uniform shape from the second end to the opening; and
   a fixed swaging engagement member;
   a movable swaging engagement member, a chamber portion of the movable swaging engagement member positioned within the chamber and translatable along the axis, the chamber portion having a first face, a second face recessed from the first face, a third face opposite the second face, and an opening extending through the second face to the third face;
   a piston having an outer surface, a proximal end, and a distal end, the proximal end of the piston positioned within the chamber at the second end, the proximal end comprising a head portion having a diameter that is less than the diameter of the outer surface of the piston, the piston secured to the chamber portion of the movable swaging engagement member, the piston translatable along the axis, wherein there is a gap formed between an outer wall of the piston and the inner wall of the chamber;
   a fastener extending through the opening and securing the third face of the chamber portion to the distal end of the piston;
   a spring compressed between a stop plate and the second face of the chamber portion of the movable swaging engagement member, wherein the spring is positioned about a head of the fastener, wherein a protrusion extends from the stop plate and the spring is positioned around the protrusion;
   a seal positioned on the head portion of the piston, wherein the seal prevents fluid from flowing between the outer surface of the piston and the inner wall of the chamber; and
   an actuator interface configured to receive input from an actuator to drive the piston along the axis through the chamber of the housing from the second end to the first end such that the movable swaging engagement member moves toward the fixed swaging engagement member.

2. The swaging tool of claim 1, wherein the fixed swaging engagement member further comprises a plurality of detents configured to secure a fitting body in position.

3. The swaging tool of claim 1, wherein the movable swaging engagement member further comprises a plurality of detents configured to secure a fitting body in position.

4. The swaging tool of claim 1, wherein the movable swaging engagement member is compressively held between the spring and the piston, and the spring becomes further compressed by the piston driving the movable swaging engagement member axially toward the first end, wherein the spring is configured to automatically retract the movable swaging engagement member after operation of the swaging tool.

5. The swaging tool of claim 1, wherein the chamber is cylindrical.

6. The swaging tool of claim 1, wherein the movable swaging engagement member and piston are configured to move along the axis without bearings.

7. The swaging tool of claim 1, wherein the movable swaging engagement member and piston are configured to move along the axis without a piston rod extending axially through the chamber.

8. The swaging tool of claim 1, wherein the gap is less than or equal to 0.005 inches.

9. The swaging tool of claim 1, wherein the housing further comprises flanges that extend at least a portion of the housing from the fixed swaging engagement member to an unactuated position of the movable swaging engagement member.

10. A method of axially swaging a ring onto a fitting, comprising:
providing the swaging tool of claim 1;
positioning the ring on a first member selected from the fixed swaging engagement member or the movable swaging engagement member;
positioning the fitting on a second member, the second member different from the first member; and
actuating the actuator such that the movable swaging engagement member moves toward the fixed swaging engagement member to swage the ring on the fitting.

11. The method of claim 10, wherein positioning the ring further comprises securing the ring to the first member using a plurality of detents disposed on the first member and securing the fitting on the second member using a plurality of detents disposed on the second member.

12. A swaging system for joining a member, the swaging system comprising:
the swaging tool of claim 1;
a fitting having a first body configured for receiving a first member; and
a ring configured for axial movement over the first body to swage the first body to the first member;
wherein the movable swaging engagement member and the fixed swaging engagement member are each configured to engage at least one of the fitting or the ring.

13. The swaging tool of claim 9, wherein the flanges extend the height of the fixed swaging engagement member and the length from the fixed swaging engagement member to the unactuated position of the movable swaging engagement member.

14. The swaging tool of claim 1, wherein a segment of the third face of the chamber portion of the movable swaging engagement member protrudes and is configured to engage with a recessed guide surface on the distal end of the piston.

15. The swaging tool of claim 1, wherein, when the swaging tool is fully actuated, there is a first space between the chamber portion of the movable swaging engagement member and a face of the housing, and a second space between the chamber portion of the movable swaging engagement member and the stop plate.

16. The swaging tool of claim 1, wherein the distal end of the piston has an axial opening configured to receive the fastener.

* * * * *